(No Model.) T. HYATT. 5 Sheets—Sheet 1.
VAULT COVERING OR ILLUMINATING GRATING AND SURFACE MADE THEREFROM.
No. 288,572. Patented Nov. 13, 1883.
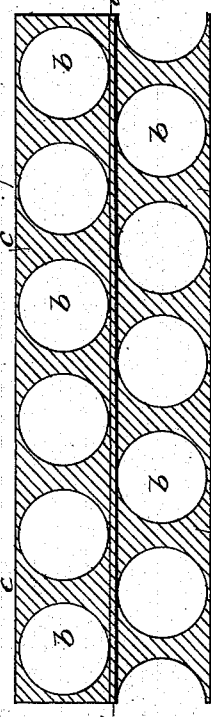
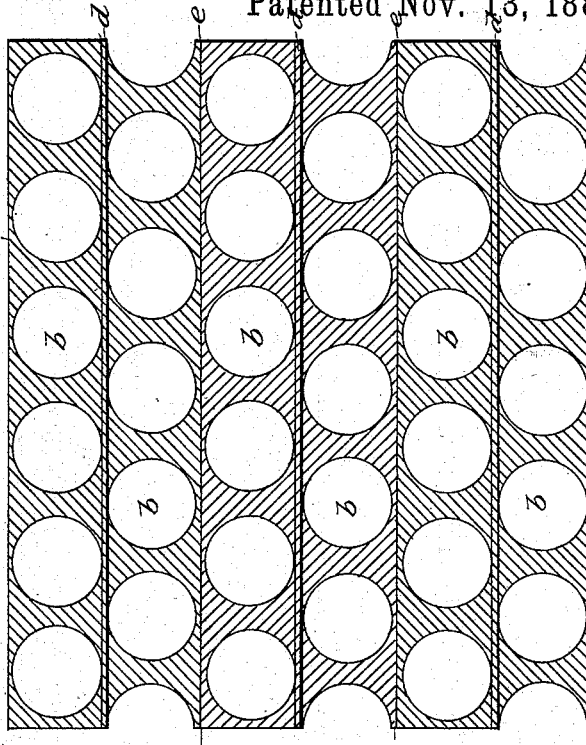
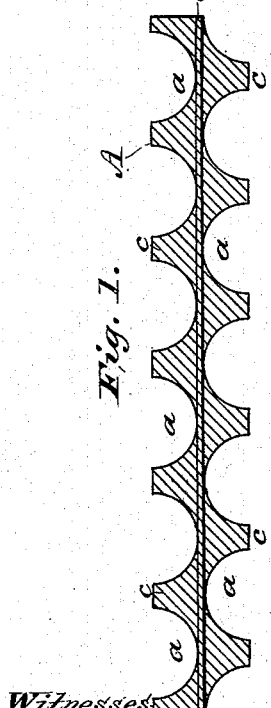
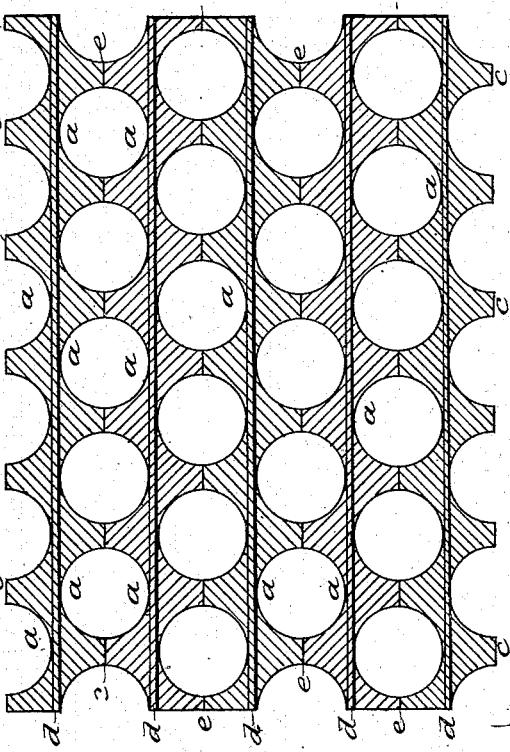
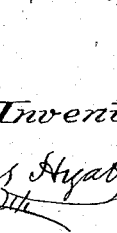
Witnesses:
T. C. Brecht
A. Simon
Inventor:
Thaddeus Hyatt (No Model.) T. HYATT. 5 Sheets—Sheet 2.
VAULT COVERING OR ILLUMINATING GRATING AND SURFACE MADE THEREFROM.
No. 288,572. Patented Nov. 13, 1883.
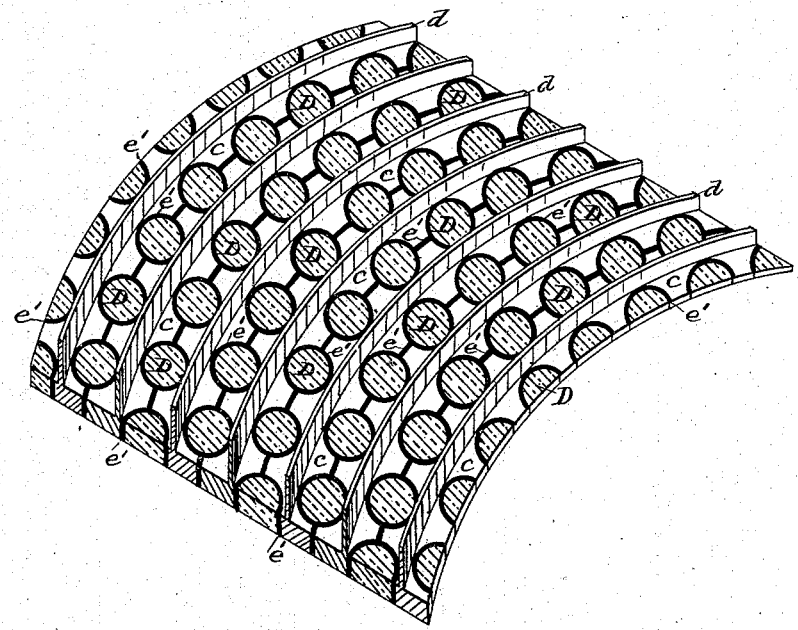
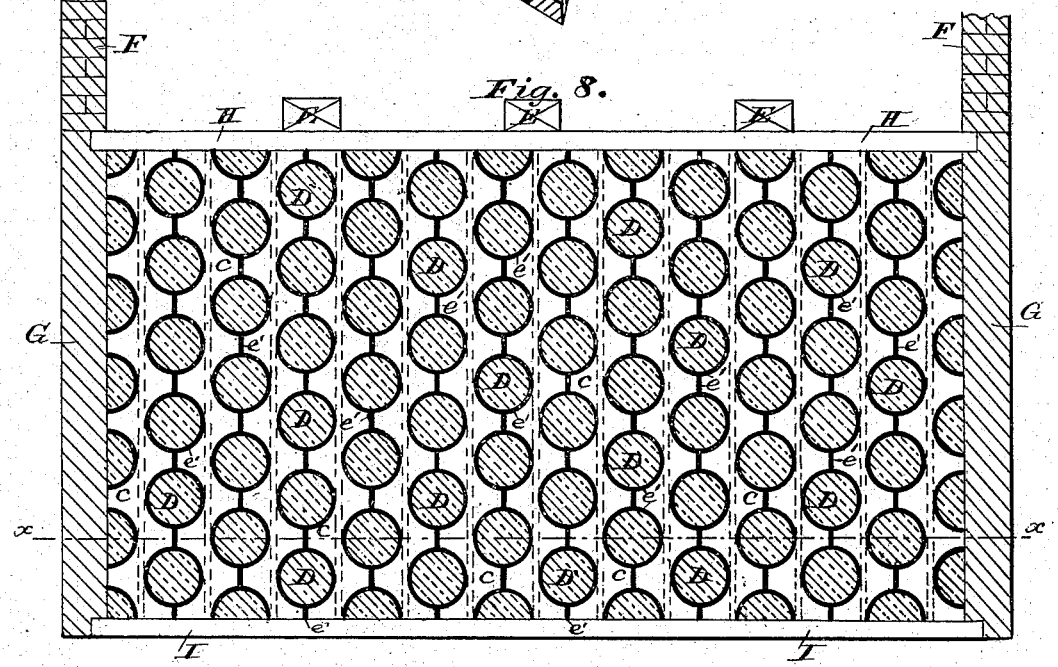
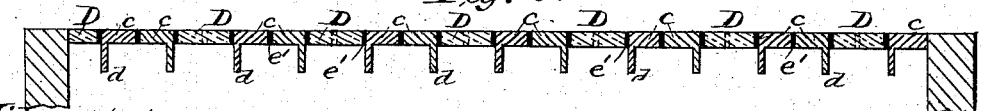
Witnesses:
T. C. Brecht
Guy De Mott
Inventor:
Thaddeus Hyatt

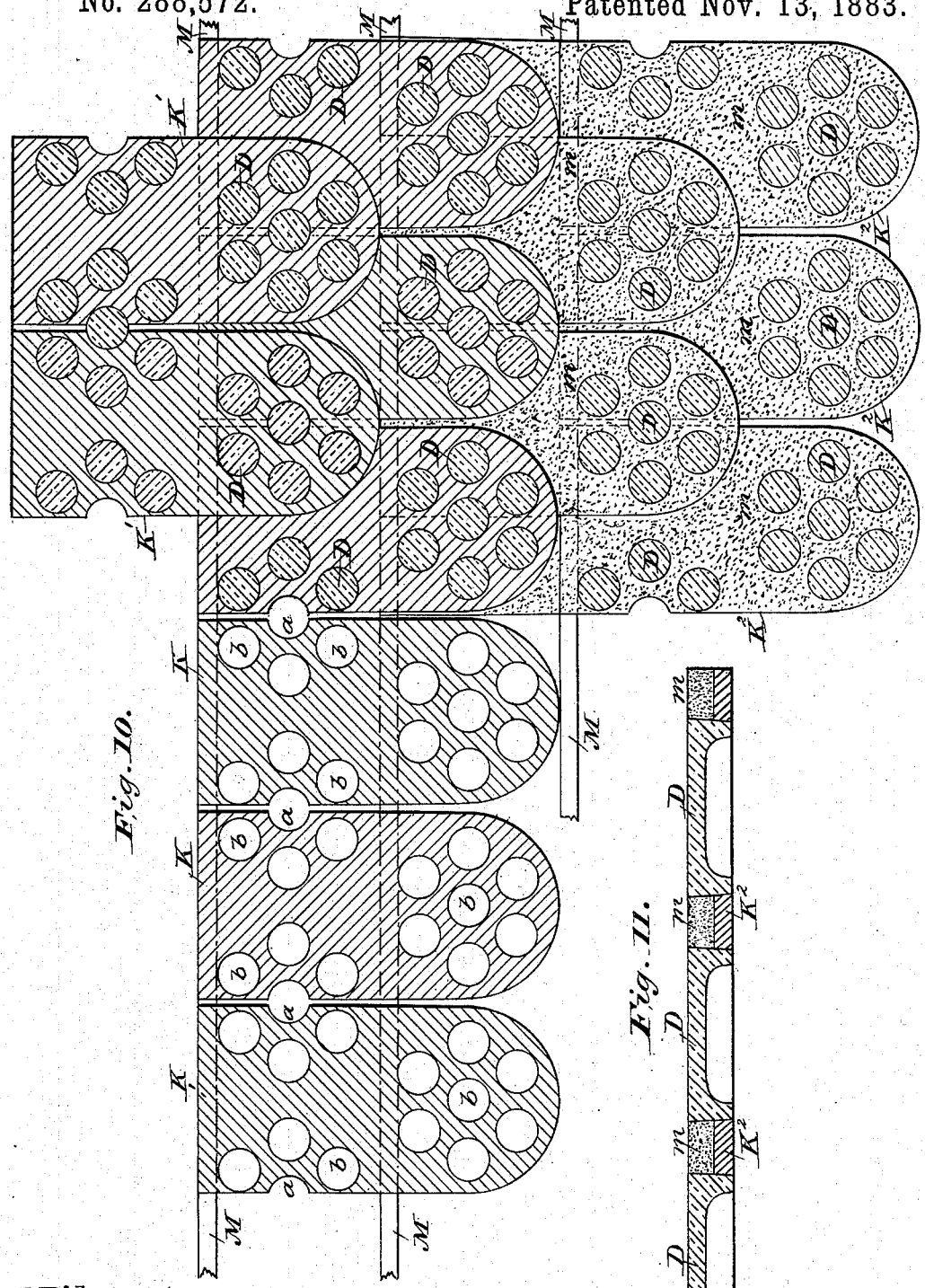

(No Model.) T. HYATT. 5 Sheets—Sheet 4.
VAULT COVERING OR ILLUMINATING GRATING AND SURFACE
MADE THEREFROM.
No. 288,572. Patented Nov. 13, 1883.
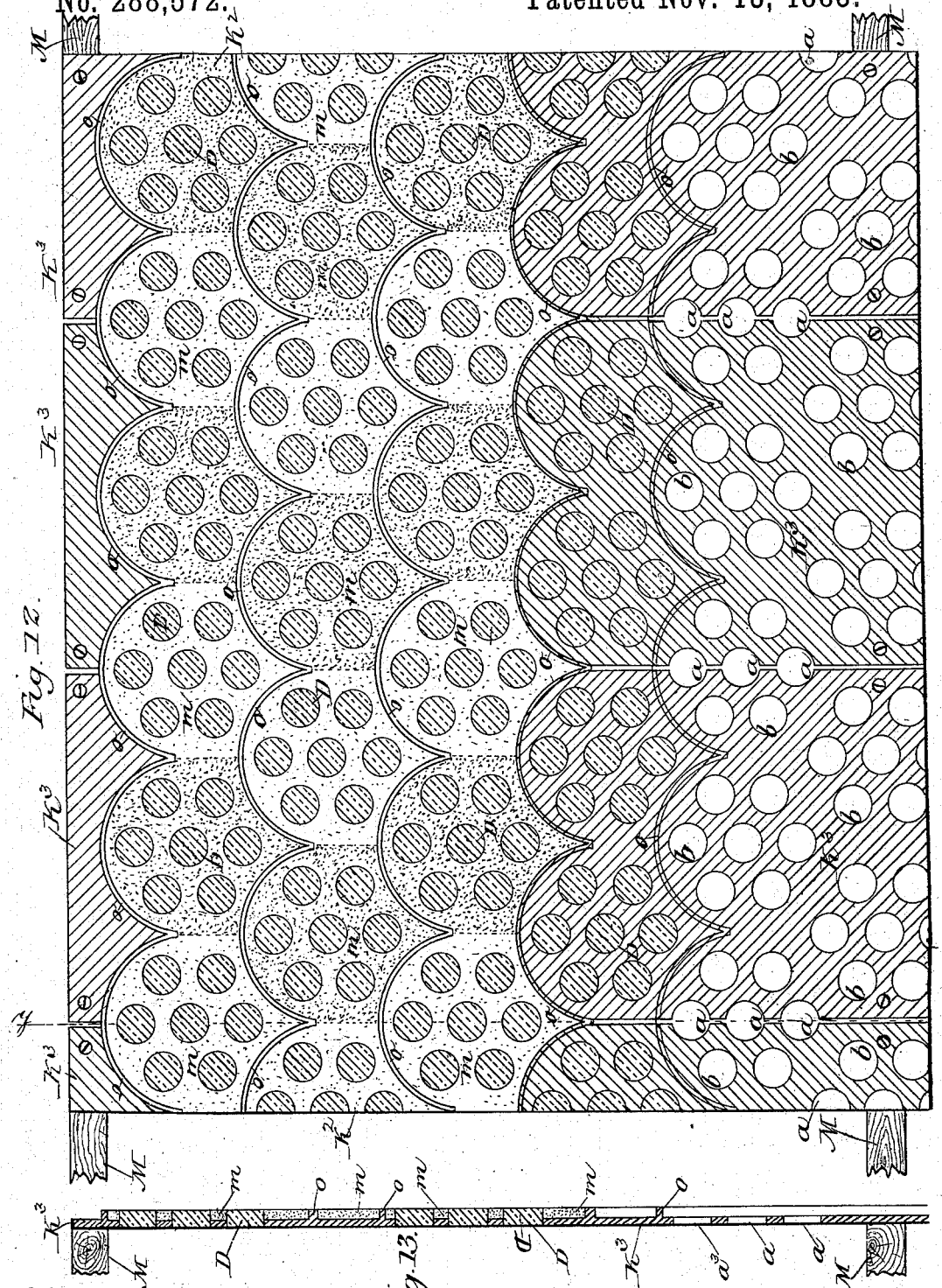
Witnesses: Inventor:

(No Model.)  T. HYATT.  5 Sheets—Sheet 5.
VAULT COVERING OR ILLUMINATING GRATING AND SURFACE MADE THEREFROM.
No. 288,572.  Patented Nov. 13, 1883.
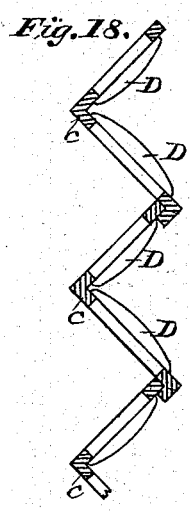
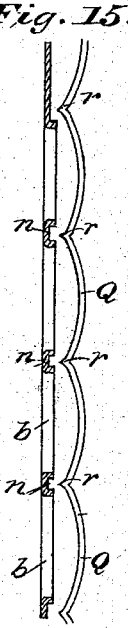
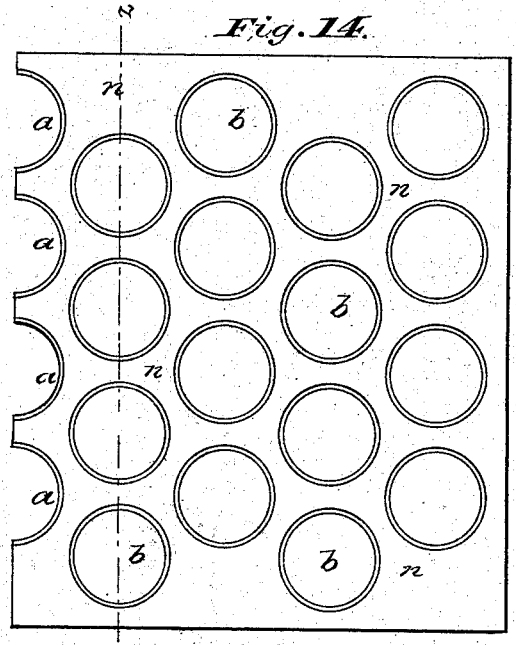
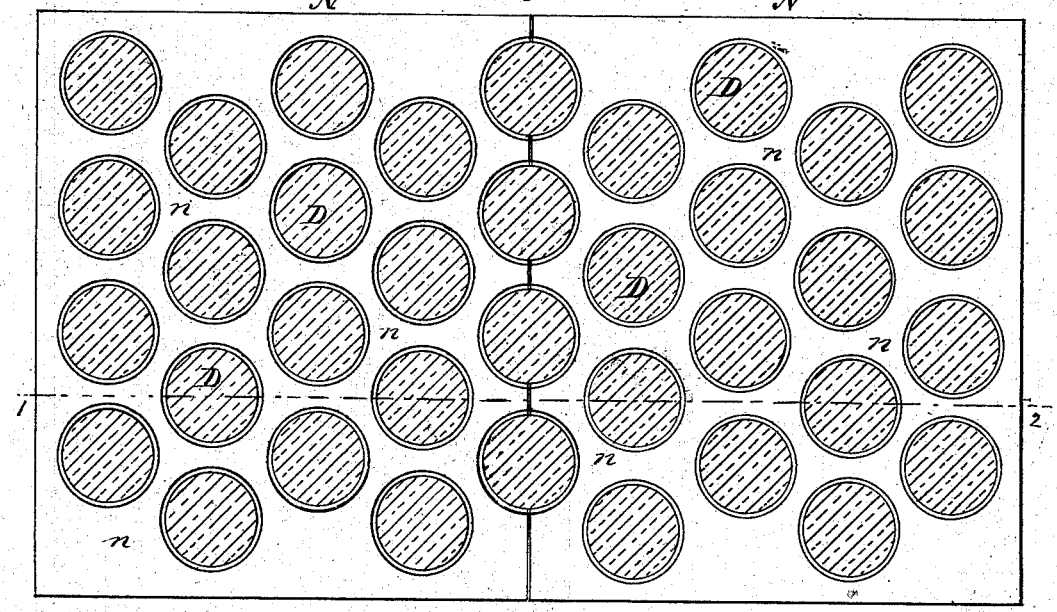
Witnesses:  Inventor:

UNITED STATES PATENT OFFICE.

THADDEUS HYATT, OF NEW YORK, N. Y.

VAULT-COVERING OR ILLUMINATING-GRATING AND SURFACE MADE THEREFROM.

SPECIFICATION forming part of Letters Patent No. 288,572, dated November 13, 1883.

Application filed October 19, 1883. (No model.) Patented in England March 4, 1874, No. 783.

*To all whom it may concern:*

Be it known that I, THADDEUS HYATT, a citizen of the United States, residing at the city of New York, in the county of New York and State of New York, have invented certain new and useful Improvements in Vault-Coverings or Illuminating-Gratings and Surfaces made therefrom, of which the following is a description, reference being had therein to the accompanying drawings, making part of this specification.

My invention relates to the construction of illuminating-sidewalks or area-coverings in the front, and of rear-extension roofs at the backs of buildings designed for stores.

The object of my improvements is to cheapen such work and make it better and handsomer.

The novel features that constitute the invention are: first, illuminating-gratings made in the shape of web-and-flange beams or bars; second, web-and-flange illuminating-gratings made with scalloped edges or open-side light-holes; third, illuminating panel-gratings constructed of web-and-flange-bar gratings; fourth, illuminating panel-gratings constructed of web-and-flange-bar gratings made with scalloped edges or open-side light-holes; fifth, illuminating surfaces, roofs, and pavements constructed of web-and-flange-bar gratings; sixth, combined joint-glasses and cement for closures to seams between gratings made with scalloped edges or open-side light-holes in illuminating constructions; seventh, illuminating ornamental slate or imitation slate roofs; eighth, illuminating non-dripping-condensed-moisture roofs.

In the drawings making part of this specification like letters refer to like parts in all the figures.

Figures 1 to 9 refer to bar-gratings and bar-grating constructions. Figs. 10 to 13 refer to ornamental slate constructions. Figs. 14 to 17 refer to non-dripping condensed-moisture roofs. Fig. 18 represents in cross-section a bar-grating ridge-and-furrow illuminating-roof. Fig. 1 is a plan view representing a web-and-flange-bar grating formed with open-side light-holes or a scalloped edge. Fig. 2 is a panel-grating made of bar-gratings such as are represented by Fig. 1. Fig. 3 is a cross-section of Fig. 1, with the web placed uppermost, as in making roof constructions. Fig. 4 is a cross-section similar to Fig. 3, but with the web downward, as in making floor and pavement constructions. Fig. 5 is a plan representing a web-and-flange-bar grating made with whole holes. Fig. 6 is a panel-grating made of bar-gratings such as are represented by Fig. 5. Fig. 7 is a perspective view representing a rear-extension curved illuminating-roof constructed of scalloped-edge bar-gratings. Fig. 8 is a plan view representing a sidewalk-light or area-covering constructed of scalloped-edge bar-gratings. Fig. 9 is a cross-section of Fig. 8 on the line $x\,x$. Fig. 10 is a plan view representing an illuminating ornamental slate-roof construction. Fig. 11 is an enlarged view in cross-section of one of the slates. Fig. 12 is a plan view representing another mode of making illuminating ornamental slate roofs. Fig. 13 is a cross-section of Fig. 12 on the line $y\,y$. Fig. 14 is a plan view representing a cast-iron roofing-plate formed with whole and half light-holes or a scalloped edge, and with a guttered top face for catching the drippings of condensed moisture from a glass weather-surface placed above it. Fig. 15 is a cross-section of Fig. 14 on the line $z\,z$. Fig. 16 is a plan view representing two plates like Fig. 14 when united at their scalloped edges. Fig. 17 is a cross-section of Fig. 16 on the line 1 2. Fig. 18 is a view in cross-section of a ridge-and-furrow roof made of illuminating L or angle-iron gratings.

A indicates a web-and-flange-bar grating formed with scalloped edges or open-side light-holes.

B indicates a web-and-flange-bar grating formed with whole holes and straight edges.

*a* indicates half-holes.

*b* indicates whole holes.

*c* indicates the flange part of the bar.

*d* indicates the web of the bar.

*e* indicates the crack or seam between the abutting edges of two meeting bar-gratings.

D indicates glasses.

*e'* indicates waterproofing-cement around the glasses and in the seams between the glasses.

E indicates the front wall granite piers, and F the side walls of the building.

G indicates the granite coping at the ends of the area.

H indicates a sill-riser or supporting-bar fastened to the face of the building for the area-covering to rest upon at that side, and I indicates the support of the area-covering at its front edge.

K indicates perforated metal plates made to imitate in size and shape ornamental slates, and fastened to purlins.

K' indicates the same after having been set with glasses, and thus made ready for the ornamental facing m indicates the facing material.

K² indicates finished plates.

K³ indicates composite ornamental roofing plates or tiles, each plate representing a number of tiles.

o indicates curved fillets cast on the face of the plates.

M indicates rafters or purlins.

N indicates guttered or drainage roofing-plates; n, the gutters or drainage-surface; Q, weather-surface made of glass plates; r, dripping-points of the glass plates; p, under lip of plate, and cemented joint at abutting scalloped edges of plates N M.

The bar-gratings, for convenience of being cut to lengths, are preferably made of wrought iron. The purpose of the web-and-flange form of grating is to be able to make illuminating constructions in themselves self-supporting, and thus adapted to any span; but self-supporting cast-iron gratings, or gratings cast with supporting-bars upon them, if made in panel or tile shape, cannot be made to be good for anything. If the tile is properly made to give light, the mass of iron in the supports will, in the cooling of the casting, tear the life out of the grating. Experimenters are all the time trying this impossible feat and patenting it; but the law of cast-iron, like the eternal law of gravitation, won't be fooled with, and the strength of these "self-supporting gratings" is a sham. Here is the explanation of it: Tile form of grating—that is, panel form—means width, and the supports for a wide casting must be strong, and therefore heavy or massive, because width of tile supposes load-carrying capacity in the tile. To be able to cast such wide gratings with supports adapted to them requires that the light-holes of the grating should be less in number and wider apart, so as to create more weight of metal in the panel, to balance the mass of metal in the supports, to make all the parts of the casting cool equally at the same time, and thus prevent unequal shrinkage and cracking or straining; but to place the light-holes of the grating wider apart is to this extent to destroy the function of the grating for transmitting light; hence the proposition to cast supports upon illuminating-gratings made in panel or tile shape is an absurdity; but when the gratings are cast with only a double row of holes—one on each side of the supporting bar or web—especially if such holes are half-holes, or made with an open side, it can be readily seen that there need be no difficulty whatever in casting such self-supporting gratings. Gratings so narrow as bar-gratings need comparatively little metal in the supporting-blades; but these blades, being, on account of the narrowness of the grating, near together, make a strong construction, even though light, just as a number of light beams placed close to each other make a stiffer and better floor than heavier timbers at great distances apart.

I do not limit my invention of bar light-gratings to the T and L form of bars, but propose to employ others, especially the U or "channel-iron" form of bar.

When for any reason it becomes desirable to make self-supporting gratings in tile or panel shape, my method of procedure is to galvanize or tin the separate bars, and then make them up mechanically by riveting or soldering them together, or both rivet and solder. Figs. 2 and 6 represent panels so made. Figs. 7, 8, and 9 represent constructions made of bar-gratings not previously made into panels. The manner in which I make constructions of the kind represented by Figs. 7 and 8 is to build up the structure on the ground before applying the glasses, this mode of construction being made necessary by the open-side light-hole feature of the gratings.

In ordinary patent light constructions the seams between the parts composing the roof or foot surface are straight seams; but where the edges or borders of the gratings are cut out or scalloped with open-side light-holes, the seams are largely made up of the light-holes themselves, so that the joint-glasses, under these circumstances, become, in combination with the waterproofing-cement, a portion of the closure material employed to make good the joint between the gratings, as indicated by e' in Figs. 7 and 8.

The fifth novel feature of the invention relates to ornamental illuminating slate roofs or imitation slate. I construct these roofs (by the method illustrated on Sheet 3, Fig. 10) of metal perforated plates in size and shape made to resemble ornamental slates, and having first cemented the glasses in the light-holes, I then put on the facing. If the facing be natural slate, I make light-holes in it to match those of the metal back, and cement it fast, the glasses, which stand above the face of the metal, entering the light-holes of the slate, where they are again encircled with additional cement; but if the facing be hydraulic cement put on in plastic form, I place the metal tile in a mold, after having first fixed the glasses, and then lay on the facing. When the plastic facing has become hard, the tile is ready for use. The half-holes in the sides of the tiles are set with glasses only after the tiles are in position and fixed to the purlins of the roof. In some cases I make the roof by first fastening the metal plates all in position thereon, the whole holes of the plates having been previously set with glasses, and the half-holes after being completed, and then put on the plastic ornamental facing by the employment of suitable molds for the purpose. By the method illustrated on Sheet 4, Fig. 12, I construct these roofs of perforated plates or tiles in size similar to those employed for making illuminating area-coverings, but of not half the weight—in fact, making them as light as they can be cast; but the light-holes, instead of being made to form break-joint ranges in lines parallel to each other, are formed in clusters to suit the ornamental shape of the facing designed to be put over the metal backing. In constructing the work, the perforated metal plates, like the scalloped-edge bar-gratings, are laid edge to edge, so that the half light-hole in the edge of one plate meets and completes the half-hole in the edge of the other. In this way the harmony of the cluster-lights design upon the face of the roof is kept up. The joint-glasses also serve as closures to the seam between two abutting tiles, as in the bar-grating constructions, with the difference that where a plastic facing of hydraulic cement or colored concrete is employed for the facing, the combination of glass and cement that makes water-proof the seam is the combination of joint-glasses and cement that makes good the cluster-lights design over the face of the work as a whole.

In constructing roofs of large plates, as represented by Fig. 12, when I employ natural slates as the facing, the plates are cast flat, with no curved fillets upon them, and when I lay on the facing in a plastic state by the use of molds, I make the plates flat and with no curved fillets; but when I employ plastic material without molds, I then cast the plates with curved fillets, as represented by Fig. 12, the glasses being first fixed in position, and the cement then laid on in the manner of making ceilings and other work of plastic material by the skill and art of clever workmen.

The sixth and last feature of novelty—a roof construction to prevent the dripping of condensed moisture—I construct of cast-iron perforated and guttered plates, the borders of the plates being scalloped, as in the case of the ornamental slate plates and half-hole bar-gratings, so that when any number of them are placed edge to abutting edge, the guttered surface will be continuous over the whole face of the drainage-surface, without break or interruption, and at the same time the light-holes over the whole surface will present a uniformly-distributed appearance, without break or interruption.

Having thus fully described and illustrated my invention, what I claim, and desire to secure by Letters Patent, is—

1. An illuminating-grating constructed in the form of a web-and-flange beam or bar.
2. A web-and-flange-bar grating made with scalloped edges or open-side light-holes.
3. Web-and-flange panel gratings or tiles made from web-and-flange-bar gratings.
4. Web-and-flange panel gratings or tiles made from web-and-flange-bar gratings formed with scalloped edges or open-side light-holes.
5. Panel gratings or tiles made with scalloped edges or open-side light-holes.
6. Illuminating surfaces, roofs, and pavements made of web-and-flange-bar gratings combined with glasses.
7. Illuminating surfaces, roofs, and pavements made of web-and-flange-bar gratings formed with scalloped edges or open-side light-holes combined with glasses.
8. Illuminating surfaces, roofs, and pavements made of web-and-flange panel gratings or tiles formed of web-and-flange-bar gratings combined with glasses.
9. Illuminating surfaces, roofs, and pavements made of web-and-flange panel gratings or tiles formed of web-and-flange-bar gratings made with scalloped edges or open-side light-holes combined with glasses.
10. Illuminating surfaces, roofs, and pavements made of panel gratings or tiles formed with scalloped edges or open-side light-holes combined with glasses.
11. In illuminating surfaces, roofs, and pavements made of abutting gratings formed with scalloped edges or open-side light-holes, a water-tight joint, seam, or closure composed of joint-glasses and joint-cement.
12. In illuminating surfaces, roofs, and pavements formed of abutting perforated plates or gratings, a water-tight joint, seam, or closure composed of joint glasses and cement.
13. In illuminating surfaces, roofs, and pavements formed of abutting perforated metal plates or gratings, a water-tight joint, seam, or closure composed of joint-glasses and a fire and water proofing face material or overlayer.
14. Ornamental illuminating-roofs made in imitation of ornamental slate set with glasses, the perforated metal plates being formed with scalloped edges or open-side light-holes, and the light-holes in the plates being arranged in groups or clusters to work in harmony with the external design appearance of the weather-face of the roof, in combination with joint-glasses combined with an ornamental fire and water proofing face material or overlayer.
15. Illuminating-roofs to prevent the dripping of condensed moisture, formed of an underlayer or roof composed of perforated metal plates made with a continuous water course or courses, in combination with an overlayer or weather-surface made of glass, and formed with dripping-edges on its under face, so placed over the water-courses as to drip the condensed moisture of the glass into them.

In testimony whereof I affix my signature in presence of two witnesses.

THADDEUS HYATT.

Witnesses:
T. C. BRECHT,
ALEX. SIMON.